United States Patent Office 2,856,437
Patented Oct. 14, 1958

2,856,437
RESORCINOL PRODUCTION

William R. Cake, Glen Rock, N. J., assignor to Heyden Newport Chemical Corporation, New York, N. Y., a corporation of Delaware No Drawing. Application December 5, 1952
Serial No. 324,417

4 Claims. (Cl. 260—628)

This invention relates to improvements in the process of producing resorcinol by disulfonating benzene to form benzene meta disulfonic acid, then neutralizing and fusing the benzene meta disulfonic acid with an alkali metal hydroxide to form alkali metal resorcinate which upon the addition of an inorganic acid is converted to resorcinol.

Resorcinol is commonly prepared by disulfonating benzene and then converting the disulfonated benzene to resorcinol. More particularly, for example, benzene is treated with fuming sulfuric acid, oleum, containing about 20% sulfur trioxide to form a reaction mixture containing benzene meta disulfonic acid, sulfuric acid and impurities. Although 20% oleum is used commercially, oleums containing a higher percentage sulfur trioxide have been suggested. The disulfonic acid mixture is thereafter neutralized and fused with an alkali metal hydroxide to form the corresponding alkali metal salt of resorcinol. The cooled fused mass is dissolved in water and acidified with a mineral acid, for example, hydrochloric acid or sulfuric acid, to form resorcinol and the alkali metal salt of the acid used for acidification. The resorcinol may be extracted by means of a solvent and the extract evaporated to remove the solvent from the resorcinol.

The disulfonation reaction mixture contains sulfuric acid. It has always been necessary to remove the sulfuric acid prior to fusion in order to obtain high yields of resorcinol, for example, yields of about 75 to 80%. If the sulfuric acid is not removed, an additional quantity of alkali metal hydroxide must be used to neutralize this acid and the alkali metal sulfate lowers the resorcinol yield. The sulfuric acid is commonly removed by adding an alkaline compound that will form an insoluble sulfate precipitate which can be removed by filtration. Milk of lime is used extensively for this purpose so that the precipitate is calcium sulfate. The milk of lime also reacts with the benzene disulfonic acid to form the calcium salt of the acid and the calcium should be replaced with an alkali metal before fusion. This may be effected by reacting the calcium salt with, for example, an alkali metal carbonate or sulfate to form the alkali metal salt of benzene disulfonic acid and calcium carbonate or sulfate precipitate which is removed by filtration. This procedure requires time and effort in addition to large amounts of lime. All of this constitutes a waste and increases the cost of resorcinol.

I have discovered that if benzene is sulfonated with a sulfonating agent essentially consisting of stabilized gamma sulfur trioxide dissolved in certain proportions in sulfuric acid, the benzene disulfonic acid in the reaction mixture can be converted to the alkali metal salt of the acid and fused with an alkali metal hydroxide to produce resorcinol at a high yield without the necessity of precipitating insoluble sulfate salts from the disulfonating mixture or in any other manner removing sulfuric acid from the reaction mixture. This greatly reduces the number of steps that must be carried out in preparing resorcinol and also reduces the quantity of raw materials required. Thus, I am able to produce resorcinol more efficiently and at a lower cost.

The sulfonating agent consists of stabilized gamma sulfur trioxide dissolved in substantially pure sulfuric acid. The stabilized gamma sulfur trioxide is the sulfonating agent and the sulfuric acid is the solvent for the trioxide. Gamma sulfur trioxide has the structure:

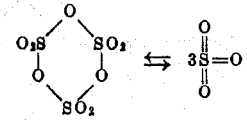

The proportions of sulfuric acid and stabilized gamma sulfur trioxide is critical. This solution must contain between 75% and 80% of the gamma sulfur trioxide with about 78% gamma sulfur trioxide being preferred. If the amount of trioxide is raised above 80% there is a rapid decrease in production as a result of charring. Lowering the trioxide content below 75% results in the presence of sufficient sulfuric acid in the reaction to require removal of this excess acid by the addition of milk of lime or its equivalent before the disulfonated benzene can be fused to produce a high yield. Restated, more than 75% sulfur trioxide is required to avoid the necessity of removing sulfuric acid and more than 80% sulfur trioxide results in charring of the benzene and a materially reduced yield. The anhydrous gamma sulfur trioxide contains a small amount, for example, one percent, of a stabilizing agent which inhibits conversion to the alpha or beta form. The stabilizing of sulfur trioxide is described in United States Patent No. 2,511,072 and stabilized sulfur trioxide is available as a commercial product.

The purity of the sulfuric acid is critical. Preferably 100% sulfuric acid is used but sulfuric acid containing traces of water may be used. When traces of water are present in the acid, the water reacts with the sulfur trioxide to form sulfuric acid thereby lowering the amount of trioxide and increasing the amount of acid. Accordingly, the presence of a very small amount of water will place the ratio of acid to trioxide outside of the range cited. This will in turn greatly lower the yield of resorcinol if the disulfonation reaction product is not treated with lime.

The conditions under which the benzene is disulfonated to form a reaction mixture containing meta benzene disulfonic acid may be the same as customarily employed heretofore when sulfonating benzene except for the use of stabilized gamma sulfur trioxide dissolved in 100% sulfuric acid as the sulfonating agent. One method of effecting fusion of meta disulfonic acid with an alkali metal hydroxide such as sodium or potassium hydroxide, is to add an aqueous solution of the hydroxide to the disulfonation reaction mixture, evaporate the resulting mixture to dryness and then fuse. When the aqueous solution of hydroxide is added, the meta disulfonic acid is neutralized; that is, converted to the sodium salt of the acid, and then on fusion with the excess alkali this salt is converted to disodium resorcinate,

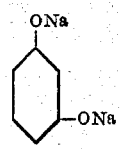

The alkali metal hydroxide required for the last reaction may be included in the aqueous solution added to the disulfonation reaction mixture or may be added after the disodium salt of the benzene meta disulfonic acid has been evaporated to dryness. Regardless of the exact procedure followed, the benzene meta disulfonic acid in the disulfonation reaction mixture is converted to disodium resorcinate by first being neutralized and then fused with alkali metal hydroxide without liming out sulfate. The hydroxide may be sodium or potassium hydroxide, or mixtures thereof, although sodium hydroxide is customarily used as it is more economical. The important chemical reactions involved may be represented as follows:

(1)
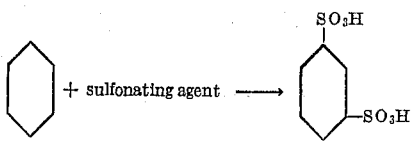

(2)
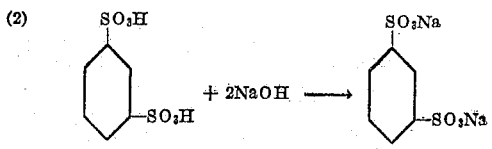

(3)
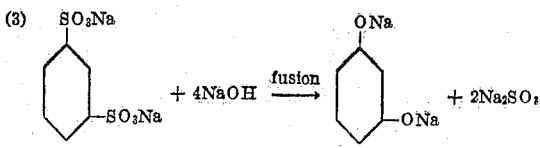

The alkali metal resorcinate is acidified with a mineral acid, such as sulfuric or hydrochloric acid and the resorcinol separated in the usual manner. The following reaction takes place:

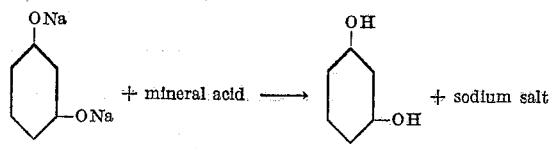

The present method produces a high percentage of resorcinol and provides a more economical way of producing resorcinol.

The following description of a preferred procedure illustrates my invention but does not limit my invention to the conditions set forth, unless so stated:

Example 1

A sulfonating agent consisting of 346 parts (4.32 moles) of stabilized gamma sulfur trioxide dissolved in 98 parts by weight of 100% sulfuric acid were placed in a flask equipped with an agitator, condenser, drying tube and thermometer along with 156 parts by weight of nitration grade benzene. The sulfonating agent consisted of 78% by weight stabilized sulfur trioxide dissolved in 22% by weight of sulfuric acid. An excess of sulfonating agent is preferred to form the maximum amount of benzene disulfonic acid. These materials were gradually added to the flask over a period of about two hours and during the addition, the temperature was held between 50 to 85° C. and then the reaction mixture was heated to 95 to 105° C. for two hours to give 606.7 parts of a dark brown viscous liquid. This mixture of sulfonation reaction products contained benzene meta disulfonic acid and sulfuric acid in addition to some reaction by-products and unreacted raw materials. The unreacted sulfonating agent did not apparently affect the yield of resorcinol.

Fifty-nine parts of the above reaction mixture were placed in a fusion pot with 50 parts of water and 62 parts of an aqueous solution of sodium hydroxide containing 49% sodium hydroxide. This brought the pH value of the solution to between 9 and 11. Then 73.5 parts of 49% aqueous sodium hydroxide solution was added and the mixture was heated under nitrogen to 360° C. in 45 minutes. The dried mixture was then heated at 360 to 375° C. for fifteen minutes to effect fusion, with the solution being stirred during the first part of the fusion period.

The fused material was quenched with 500 parts of water and cooled to 60° C. The solution was then acidified to a pH value of 5 to 6, with 62.7 parts of concentrated hydrochloric acid to convert the sodium resorcinate to resorcinol and sodium chloride. The acidified mixture was cooled to room temperature and then filtered. The filtrate was saturated with sodium chloride and extracted with three portions of a one to one mixture of ether and benzene with each portion containing about 250 parts by weight. The extracts were dried over anhydrous calcium sulfate and filtered. The filtrate was heated to evaporate the solvent, thereby producing a tan crystalline material. The yield of pure resorcinol was 80% of theoretical based on the amount of benzene charged.

A series of similar runs were made as follows:

| Example No. | Sulfonating Solution | Percent Yield Resorcinol |
|---|---|---|
| 2 | 23% sulfuric acid<br>77% sulfur trioxide not stabilized | 67 |
| 3 | 23% of 98.7% sulfuric acid<br>77% stabilized sulfur trioxide | 71 |
| 4 | 18% sulfuric acid<br>82% stabilized sulfur trioxide | 73 |
| 5 | 26% sulfuric acid<br>74% stabilized sulfur trioxide | 67 |

Example 2 illustrates the drop in yield resulting when an oleum containing 77% non-stabilized sulfur trioxide is used. Such an oleum is not available commercially.

Example 3 illustrates how the purity of the sulfuric acid is critical. In this example, the sulfuric acid contained 98.7% $H_2SO_4$ with the impurity being substantially water. The water reacted with the trioxide to form sulfuric acid so that the sulfonating agent actually contained less than 75% of the trioxide and more than 25% of sulfuric acid. If there is some water present in the sulfuric acid, then this water must be taken into consideration when making up the sulfonating agent or the sulfonating agent will not consist of from 75 to 80% stabilized sulfur trioxide dissolved in 100% sulfuric acid.

Examples 4 and 5 illustrate how the yield is lowered when the sulfonating solution contains more than 80% sulfur trioxide which results in charring of the benzene or when the sulfonating solution contains less than 75% sulfur trioxide.

I claim:
1. In the process of producing resorcinol from benzene, the steps comprising disulfonating benzene with a sulfonating solution consisting by weight of from 75% to 80% of the sulfonating agent stabilized gamma sulfur trioxide dissolved in sulfuric acid, thereby producing a reaction mixture containing benzene meta disulfonic acid and sulfuric acid, adding alkali metal hydroxide to the reaction mixture and neutralizing and fusing the benzene meta disulfonic acid without precipitating insoluble salts out of the reacton mixture, thereby producing alkali metal resorcinate, and thereafter treating the alkali metal resorcinate with an inorganic acid to produce resorcinol.

2. The process of producing resorcinol as claimed in claim 1 in which the alkali metal hydroxide is sodium hydroxide.

3. The process of producing resorcinol as claimed in claim 1 in which the sulfonating solution contains 78% by weight of stabilized gamma sulfur trioxide.

4. The process of producing resorcinol from benzene, comprising disulfonating benzene with a sulfonating solution consisting of stabilized gamma sulfur trioxide dissolved in sulfuric acid, the sulfonating solution containing between 75 and 80% by weight of sulfur trioxide with the remainder being sulfuric acid, thereby producing a reaction mixture containing benzene meta disulfonic acid and sulfuric acid, adding an aqueous solution of alkali metal hydroxide to the reaction mixture, thereby neutralizing the benzene meta disulfonic acid and converting the benzene meta disulfonic acid to the alkali metal salt of benzene disulfonic acid and also neutralizing and converting the sulfuric acid to sodium sulfate, drying the resulting mixture and fusing the dried mixture with alkali metal hydroxide to convert the alkali metal salt of benzene disulfonic acid to the alkali metal salt of resorcinol, all of the aforesaid steps being carried out without precipitating water insoluble sulfate salts from the reaction mixture, and then converting the alkali metal salt of resorcinol to resorcinol and separating the resorcinol.

References Cited in the file of this patent

UNITED STATES PATENTS

| | | |
|---|---|---|
| 1,308,757 | Houghton | July 8, 1919 |
| 1,915,925 | Cotton | June 27, 1933 |

OTHER REFERENCES

Holleman et al.: Chem. Abstracts, vol. 5 (1911), pp. 680–681.

"Sulfan," Technical Service Bulletin SF–1, pp. 1 and 5; published by General Chemical Co. (1947), 40 Rector St., New York, N. Y.